US012397455B2

(12) United States Patent
Kalkstein

(10) Patent No.: US 12,397,455 B2
(45) Date of Patent: Aug. 26, 2025

(54) MULTI-BLADE KNIFE ASSEMBLY WITH PROTECTIVE COVER

(71) Applicant: Lawrence Kalkstein, Ridgefield, CT (US)

(72) Inventor: Lawrence Kalkstein, Ridgefield, CT (US)

( * ) Notice: Subject to any disclaimer, the term of this patent is extended or adjusted under 35 U.S.C. 154(b) by 263 days.

(21) Appl. No.: 18/171,898

(22) Filed: Feb. 21, 2023

(65) Prior Publication Data

US 2023/0339128 A1 Oct. 26, 2023

Related U.S. Application Data

(60) Provisional application No. 63/363,577, filed on Apr. 26, 2022.

(51) Int. Cl.

| | |
|---|---|
| ***B26B 5/00*** | (2006.01) |
| ***B26B 29/02*** | (2006.01) |
| *B26B 3/04* | (2006.01) |

(52) U.S. Cl.

CPC .............. *B26B 5/008* (2013.01); *B26B 29/02* (2013.01); *B26B 3/04* (2013.01)

(58) Field of Classification Search

CPC ........... B26B 5/008; B26B 29/02; B26B 3/04; B26B 29/025

USPC ......... 30/298, 142, 147, 148, 149, 150, 152, 30/173, 299, 304, 295, 296, 1, 123, 138, 30/298.4, 151, 143, 286; 76/82, 88; D7/401.2, 649, 693

See application file for complete search history.

(56) References Cited

U.S. PATENT DOCUMENTS

| | | | | | |
|---|---|---|---|---|---|
| 1,205,871 | A | | 11/1916 | Dwyer | |
| 1,278,682 | A | * | 9/1918 | Kohnz. , Jr. | B26B 3/04 30/304 |
| 4,085,504 | A | * | 4/1978 | Nagy | B26B 3/04 30/304 |
| D255,974 | S | * | 7/1980 | Jacoby | 30/295 |

(Continued)

FOREIGN PATENT DOCUMENTS

CN 107379027 A 11/2017

OTHER PUBLICATIONS

International Search Report and Written Opinion of International Application No. PCT/US2023/062923, 25 Pages, Jul. 20, 2023.

*Primary Examiner* — Ghassem Alie

(74) *Attorney, Agent, or Firm* — HESLIN ROTHGERBER FARLEY & MESITI P.C.

(57) ABSTRACT

A knife assembly includes a multi-bladed knife and a protective cover. The multi-bladed knife includes a handle and a plurality of blades attached to the handle. Each blade of the plurality of blades extends longitudinally from the handle and substantially parallel to each other. Each blade includes a bottom cutting edge and a top non-cutting edge connected therebetween by opposing blade side surfaces. The protective cover includes a cover top and a pair of opposing cover side walls. The cover top is configured to fit over a substantial portion of each of the top non-cutting edges of the plurality of blades. The cover side walls extend downward and substantially parallel to each other from opposing end portions of the cover top. The cover side walls are spaced a predetermined distance apart to frictionally fit against outer most side surfaces of opposing outer most blades of the plurality of blades.

18 Claims, 6 Drawing Sheets

(56) References Cited

U.S. PATENT DOCUMENTS

| | | | | | |
|---|---|---|---|---|---|
| 4,969,267 | A * | 11/1990 | Anenberg | B26B 3/04 | |
| | | | | 30/304 | |
| D342,000 | S * | 12/1993 | Diotte | D7/693 | |
| 6,381,855 | B1 * | 5/2002 | Lin | B26B 29/02 | |
| | | | | 30/286 | |
| 7,434,320 | B2 * | 10/2008 | Aston, III | B26B 3/00 | |
| | | | | 30/296.1 | |
| D610,399 | S * | 2/2010 | Hamlin | D7/387 | |
| 8,931,381 | B2 * | 1/2015 | Poran | B26B 29/063 | |
| | | | | 83/13 | |
| 2006/0179665 | A1 | 8/2006 | Aston | | |
| 2012/0066914 | A1 | 3/2012 | Hayes | | |
| 2016/0193742 | A1 * | 7/2016 | Faiola | B26B 3/00 | |
| | | | | 30/296.1 | |
| 2020/0246992 | A1 * | 8/2020 | Ritter | B26B 29/02 | |

* cited by examiner

MULTI-BLADE KNIFE ASSEMBLY WITH PROTECTIVE COVER

CROSS REFERENCE TO RELATED APPLICATIONS

This application is a non-provisional of, and claims the benefit of the filing date of, U.S. provisional application 63/363,577, filed Apr. 26, 2022, entitled, "MULTI-BLADE KNIFE ASSEMBLY WITH PROTECTIVE COVER," the contents of which are incorporated herein by reference in their entirety.

TECHNICAL FIELD

The present disclosure relates to knives. More specifically, the disclosure relates to multi-bladed knives.

BACKGROUND

Knives are often used to cut or chop multiple slices of food products, such as vegetables, fruits, nuts or the like. Knives often include a single blade, which require many repeated chopping motions that can be very time consuming and tedious, especially for an inexperienced user or chef.

Additionally, a user often will use one hand on the knife handle and one hand on the non-cutting edge of the knife blade for added leverage during a chopping operation. However, such repeated pressing motion on the non-cutting edge of a knife blade can make a user's hand sore or irritated. Additionally, since knife blades are not designed to be grasped, a user's hand can more easily slip off of the non-cutting edge of a knife blade than can slip off of a handle of the knife.

Accordingly, there is a need for a knife, or knife assembly, that can make multiple cuts simultaneously. Further there is a need for a knife assembly that can protect and cushion a user's hand that is placed on the non-cutting edge of the knife. Moreover, there is a need for a knife assembly that can prevent slippage of a user's hand off of the non-cutting edge of a knife blade during a cutting or chopping operation.

BRIEF DESCRIPTION

The present disclosure offers advantages and alternatives over the prior art by providing a multi-blade knife assembly with a protective cover over the non-cutting edges of the knife. The multiple blades may make multiple cuts simultaneously. The blades may also be designed to be removeable and/or interchangeable on the knife handle.

Additionally, a protective cover over the non-cutting edges of the knife blades provides protection and cushioning of a user's hand during a cutting or chopping operation. Moreover, a finger ring may be disposed on the protective cover to anchor a user's finger to the cover such that the user's hand does not inadvertently slide off of the plurality of blades during a chopping operation.

A knife assembly in accordance with one or more aspects of the present disclosure includes a multi-bladed knife and a protective cover. The multi-bladed knife includes a handle and a plurality of blades attached to the handle. Each blade of the plurality of blades extends longitudinally from the handle and substantially parallel to each other. Each blade includes a bottom cutting edge and a top non-cutting edge connected therebetween by opposing blade side surfaces. The protective cover includes a cover top and a pair of opposing cover side walls. The cover top is configured to fit over a substantial portion of each of the top non-cutting edges of the plurality of blades. The cover side walls extend downward and substantially parallel to each other from opposing end portions of the cover top. The cover side walls are spaced at a predetermined distance apart to frictionally fit against outer most side surfaces of opposing outer most blades of the plurality of blades.

In some examples of the knife assembly, the protective cover includes a finger ring pivotally attached to the cover top, the finger ring sized to receive a finger of a user's hand therethrough.

In some examples of the knife assembly, the protective cover is operable to protect and cushion a user's hand when pressing on the non-cutting edges of the plurality of blades during a chopping operation. Further the finger ring is operable to anchor the user's finger to the cover such that the user's hand does not inadvertently slide off of the plurality of blades during the chopping operation.

In some examples of the knife assembly, the protective cover is removably fit over the plurality of blades.

In some examples of the knife assembly, the protective cover includes at least one spacer tab extending downward and substantially parallel to the cover side walls from the cover top. The at least one spacer tab has a thickness that is sized to frictionally fit into at least one separation space formed between side surfaces of a pair of adjacent blades of the knife.

In some examples of the knife assembly, the at least one spacer tab includes a plurality of spacer tabs. Each spacer tab is sized to frictionally fit into each separation space formed between side surfaces of each pair of adjacent blades of the knife.

In some examples of the knife assembly, the at least one spacer tab includes a single spacer tab sized to frictionally fit between a single pair of blades of the knife.

In some examples of the knife assembly, the at least one spacer tab includes a first and a second spacer tab. The first spacer tab is sized to frictionally fit between a first separation space formed between side surfaces of a first blade adjacent to a second blade of the knife. The second spacer tab is sized to frictionally fit between a second space formed between side surfaces of the second blade adjacent to a third blade of the knife.

In some examples of the knife assembly, the plurality of blades includes at least a pair of blades.

In some examples of the knife assembly, the plurality of blades includes at least three blades.

In some examples of the knife assembly, each blade of the plurality of blades are removably attached to the handle of the knife.

In some examples of the knife assembly, a blade connector mechanism is positioned between the handle and the plurality of blades. The blade connector mechanism is operable to attach and detach each blade of the plurality of blades to the handle of the knife.

A protective cover in accordance with one or more aspects of the present disclosure includes a protective cover for a multi-bladed knife. The knife includes a handle, and a plurality of blades attached to the handle, each blade of the plurality of blades extending longitudinally from the handle and substantially parallel to each other, each blade comprising a bottom cutting edge and a top non-cutting edge connected therebetween by opposing blade side surfaces. The protective cover includes a cover top and a pair of opposing cover side walls. The cover top is configured to fit over a substantial portion of each of the top non-cutting edges of the plurality of blades. The pair of opposing cover side walls extend downward and substantially parallel to each other from opposing end portions of the cover top. The cover side walls are spaced a predetermined distance apart to frictionally fit against outer most side surfaces of opposing outer most blades of the plurality of blades of the knife.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

DRAWINGS

The disclosure will be more fully understood from the following detailed description taken in conjunction with the accompanying drawings, in which.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms “significantly”, “substantially”, “approximately”, “about”, “relatively,” or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1A:
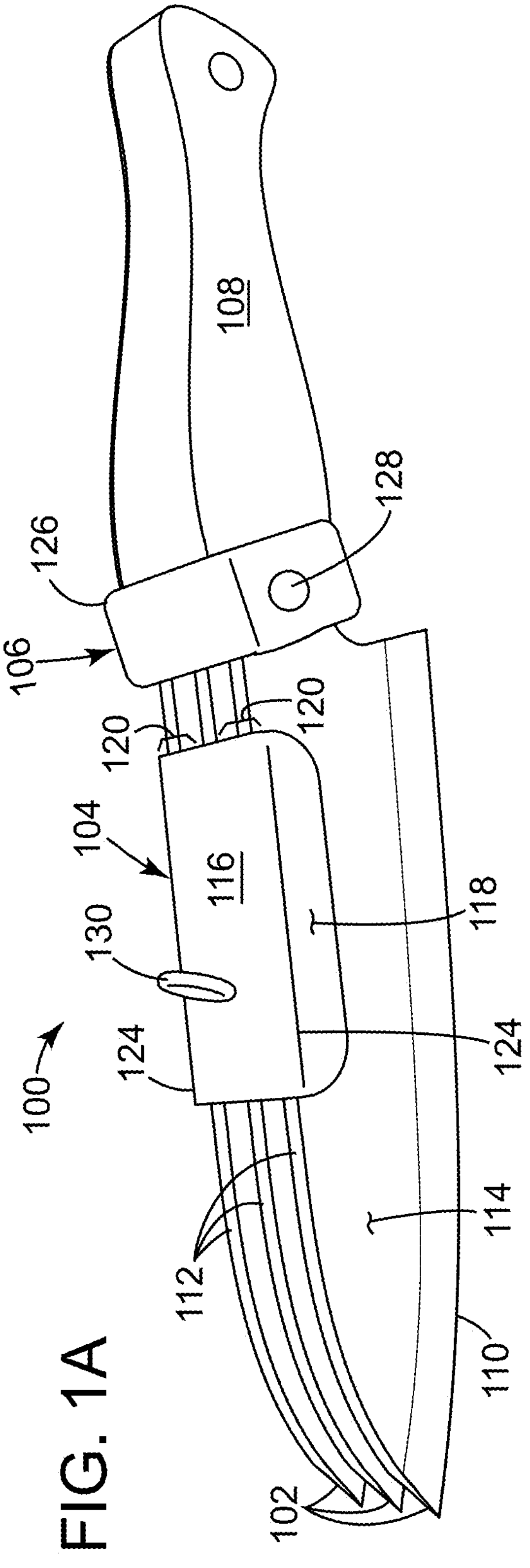
FIG. 1A depicts an example of side perspective views of a multi-blade knife assembly having 3 blades, wherein the 3 bladed multi-blade knife assembly incudes a protective cover press fit thereon, according to aspects described herein.
Figure 1B:
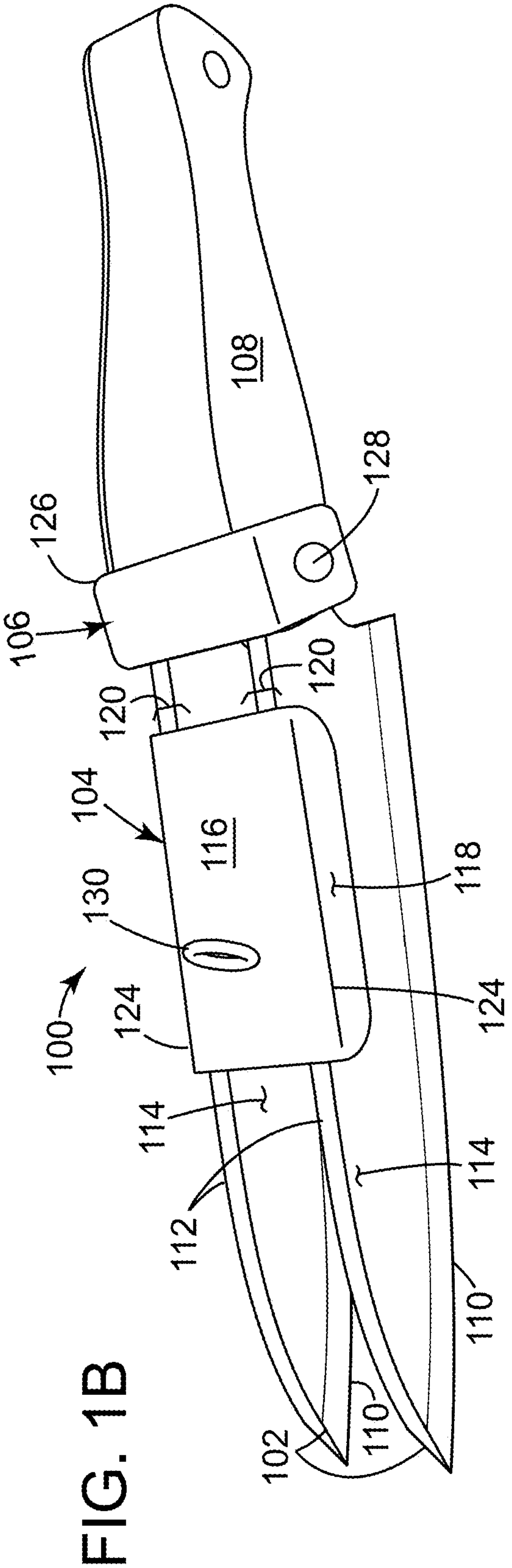
FIG. 1B depicts an example of side perspective views of a multi-blade knife assembly having 2 blades, wherein the 2 bladed multi-blade knife assembly incudes a protective cover press fit thereon, according to aspects described herein.
Figure 2A:
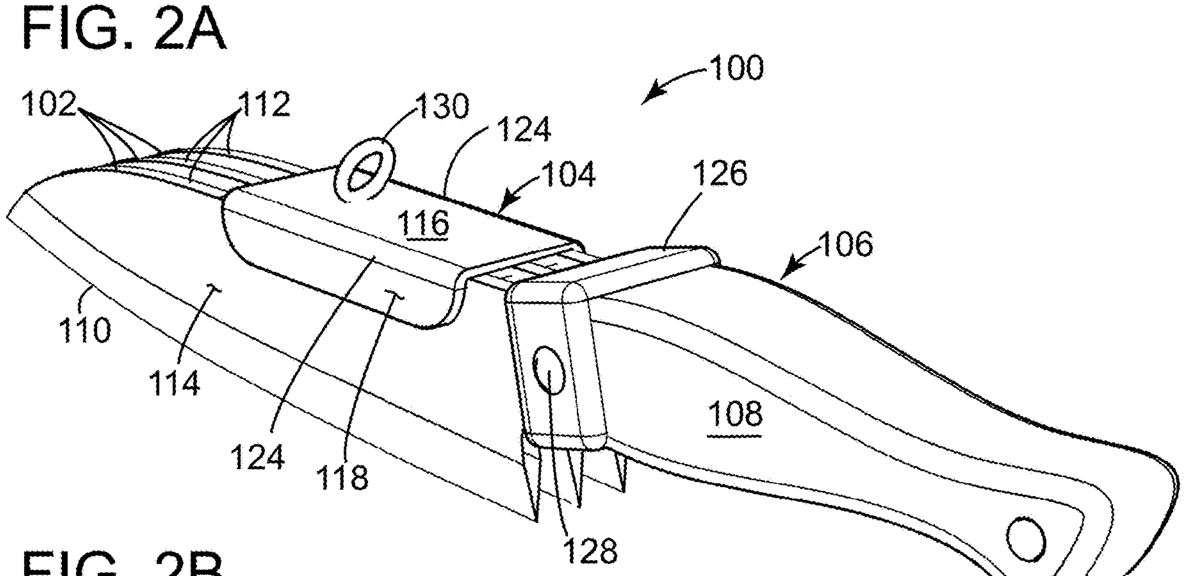
FIG. 2A depicts an example of a side-rear perspective view of the multi-blade knife assembly of FIG. 1A, according to aspects described herein.
Figure 2B:
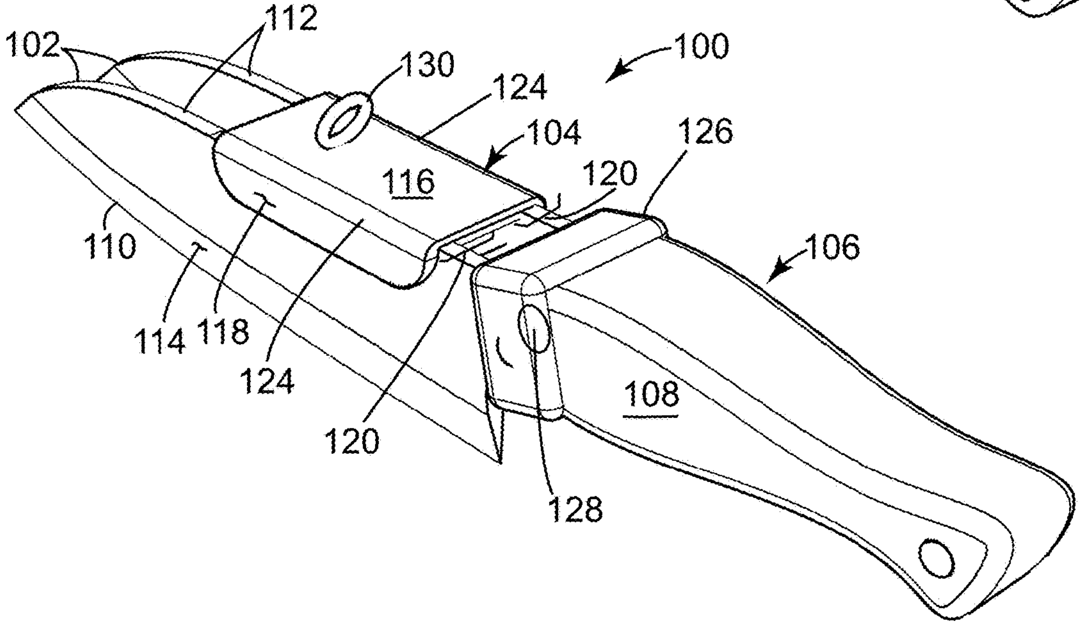
FIG. 2B depicts an example of a side-rear perspective view of the multi-blade knife assembly of FIG. 1B, according to aspects described herein.
Figure 3A:
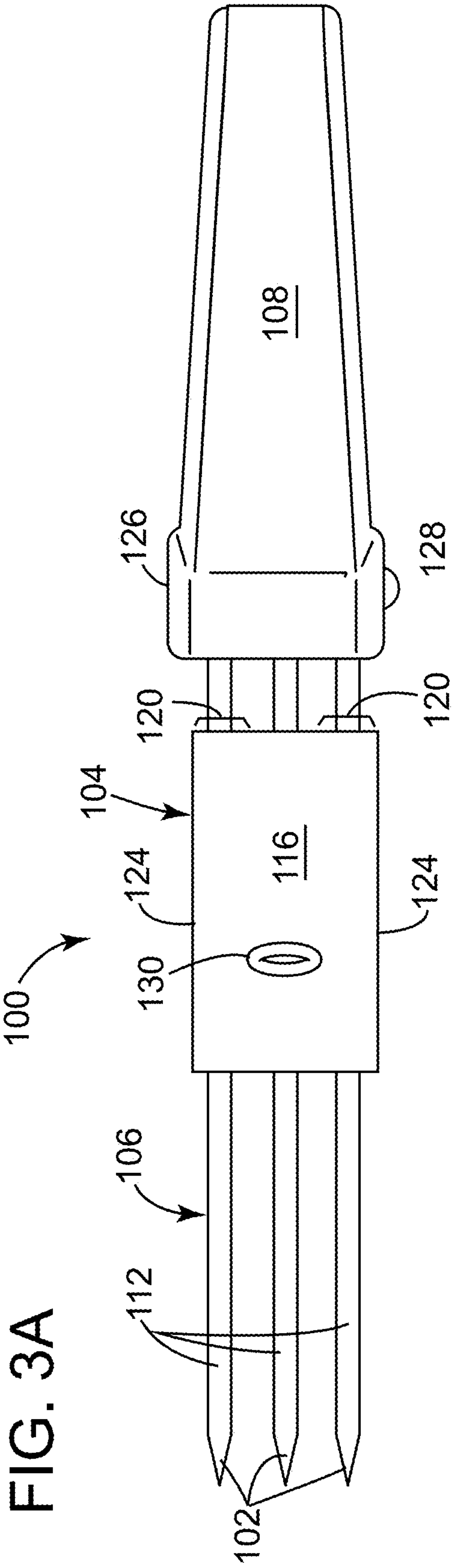
FIG. 3A depicts an example of a top view of the multi-blade knife assembly of FIG. 1A, according to aspects described herein.

Referring to FIGS. 1A, 2A, and 3A an example is depicted of a side perspective view (FIG. 1A), a side-rear perspective view (FIG. 2A) and a top view (FIG. 3A) of a multi-blade knife assembly 100. The example of the multi-blade knife assembly 100 as illustrated in FIGS. 1A-3A includes 3 blades 102. The multi-blade knife assembly 100 of FIGS. 1A-3A also includes a protective cover 104 press fit thereon, according to aspects described herein.

Figure 3B:
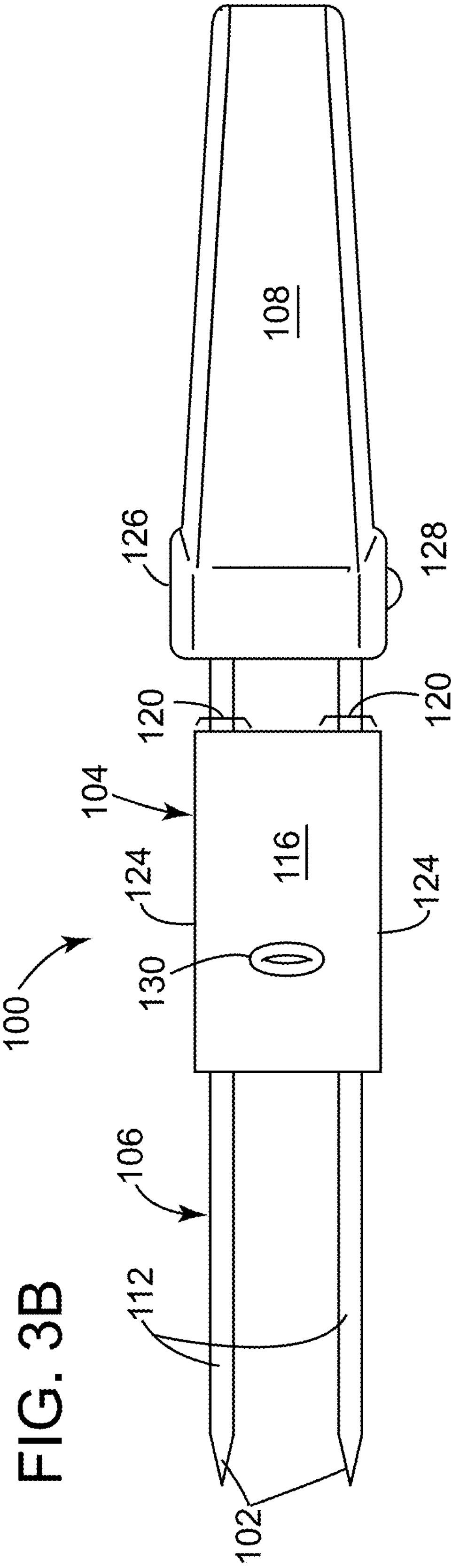
FIG. 3B depicts an example of a top view of the multi-blade knife assembly of FIG. 1B, according to aspects described herein.

Referring also to FIGS. 1B, 2B, and 3B another example is depicted of a side perspective view (FIG. 1B), a side-rear perspective view (FIG. 2B) and a top view (FIG. 3B) of a multi-blade knife assembly 100. The example of the multi-blade knife assembly 100 as illustrated in FIGS. 1B-3B includes 2 blades 102. The multi-blade knife assembly 100 of FIGS. 1B-3B also includes a protective cover 104 press fit thereon, according to aspects described herein. 0037. The multi-blade knife assembly 100 includes a multi-bladed knife 106 and a protective cover 104. The multi-bladed knife 106 includes a handle 108 and a plurality of blades 102 attached to the handle 108. Each blade 102 of the plurality of blades 102 extends longitudinally from the handle 108 and also extends substantially parallel to each other. Each blade 102 includes a bottom cutting edge 110 and a top non-cutting edge 112 connected therebetween by opposing blade side surfaces 114.

Though the multi-blade knife assemblies 100 of FIGS. 1A-3A and FIGS. 1B-3B illustrate 3 bladed and 2 bladed knife assemblies 100 respectively, the knife assembly 100 may be designed to include any number of blades 102. For example, a multi-blade knife assembly 100 may include a pair of blades 102, three blades 102, four blades 102, five blades 102 or more.

The plurality of blades 102 may be permanently affixed to the handle 108 of the multi-bladed knife 106. However, in the examples illustrated in FIGS. 1A-3A and 1B-3B, each blade 102 of the plurality of blades 102 are removably attached to the handle 108 of the knife 106.

With regards to the blades 102 being removably attached, a blade connector mechanism 126 is positioned between the handle 108 and the plurality of blades 102. The blade connector mechanism 126 is operable to attach and detach each blade 102 of the plurality of blades 102 to the handle 108 of the knife 106. The blade connector mechanism may operate via any number of appropriate attachment features. For example, and without limitation, a spring loaded disconnect button 128 may be depressed to leverage and disconnect a latching retainer (not shown) from a base portion (not shown) of the detachable blade 102 that is inserted into the front end of the handle 108.

The protective cover 104 includes a cover top 116 and a pair of opposing cover side walls 118. The cover top 116 is configured to fit over a substantial portion of each of the top non-cutting edges 112 of the plurality of blades 102. The cover side walls 118 extend downward and substantially parallel to each other from opposing end portions 120 of the cover top 116. The cover side walls 118 are spaced a predetermined distance 122 apart to frictionally fit against outer most side surfaces 114A of opposing outer most blades 102 of the plurality of blades 102.

Though the cover side walls 118 are each illustrated in FIGS. 1A-3A and 1B-3B as a single side wall 118 extending substantially entirely across the distal side ends 124 of the top 116 of the protective cover 104, the cover side walls 118 may be designed in several other configurations. For example, the cover side walls 118 may be configured as multiple tab-like sections extending across each distal side end 124 of the cover top 116. Moreover, the end portion 120, from which the side walls 118 extend, may include more than just the distal side ends 124 of the cover top 116. Rather the end portions 120 may include an outer quarter or an outer third of the cover top 116 and the side walls 118 may extend from any position within the boundaries of the end portions 120.

The protective cover 104 includes a finger ring 130 pivotally attached to the cover top 116. The finger ring 130 is sized to receive a finger 132 of a user's hand 134 therethrough. The protective cover 104 is operable to protect and cushion a user's hand 134 when pressing on the non-cutting edges 112 of the plurality of blades 102 during a chopping operation (see FIG. 6). The finger ring 130 is operable to anchor the user's finger 132 to the cover 104 such that the user's hand 134 does not inadvertently slide off of the plurality of blades 102 during the chopping operation.

The protective cover 104 may be permanently affixed to the blades 102 of the multi-bladed knife 106. However, in the examples illustrated in FIGS. 1A-3A and 1B-3B, the protective cover 104 is removably frictionally fit over the plurality of blades 102.

Figure 4A:
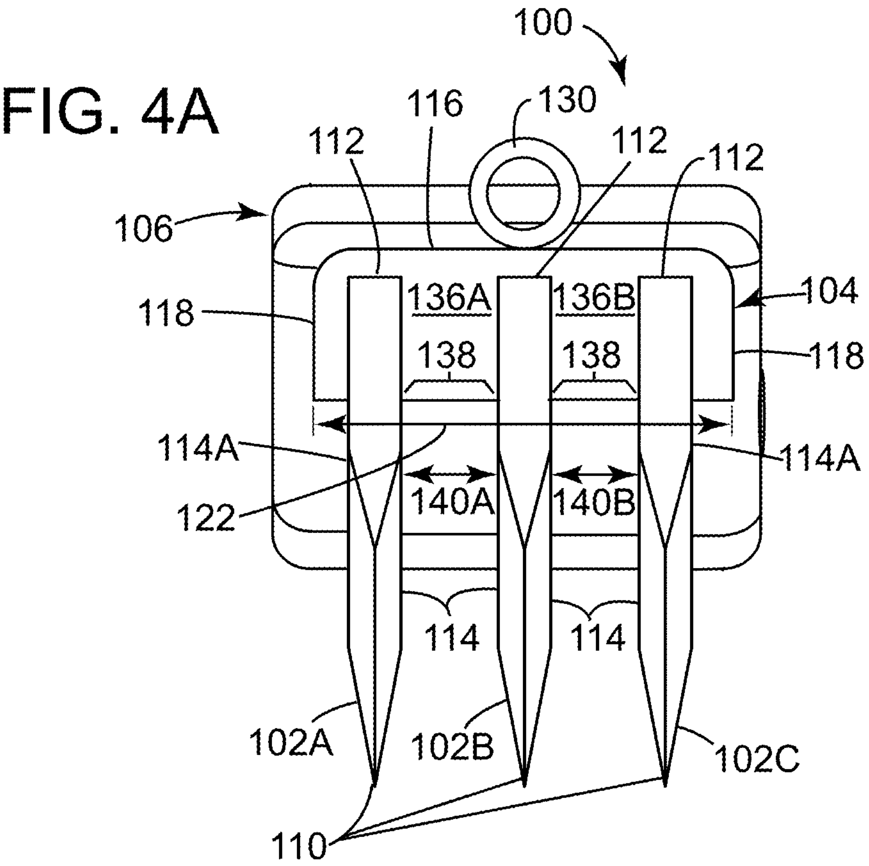
FIG. 4A depicts an example of a front view of the multi-blade knife assembly of FIG. 1A, according to aspects described herein.
Figure 4B:
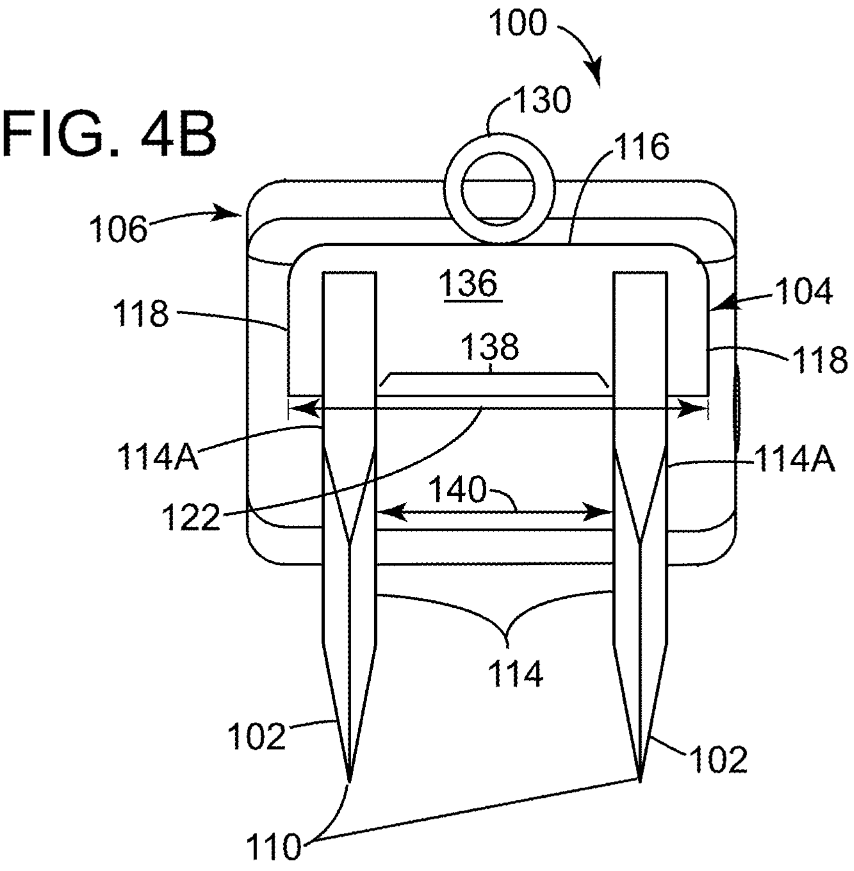
FIG. 4B depicts an example of a front view of the multi-blade knife assembly of FIG. 1B according to aspects described herein.

Referring to FIGS. 4A and 4B, an example is depicted of a front view (FIG. 4A) of the 3 bladed multi-blade knife assembly 100 of FIG. 1A and a front view (FIG. 4B) of the 2 bladed multi-blade knife assembly 100 of FIG. 1B, according to aspects described herein. The examples of a protective cover 104 illustrated in FIGS. 4A and 4B each include at least one spacer tab 136 extending downward and substantially parallel to the cover side walls 118 from the cover top 116. The at least one spacer tab 136 has a thickness 138 that is sized to frictionally fit into at least one separation space 140 formed between side surfaces 114 of a pair of adjacent blades 102 of the multi-bladed knife 106.

The at least one spacer tab 136 may include a plurality of spacer tabs 136, wherein each spacer tab 136 is sized to frictionally fit into each separation space 140 formed between side surfaces 114 of each pair of adjacent blades 102 of the knife 106. In the specific example illustrated in FIG. 4B, the at least one spacer tab 136 includes a single spacer tab 136 sized to frictionally fit between a single pair of blades 102 of the knife 106. In the specific example illustrated in FIG. 4A, the at least one spacer tab 136 includes a first spacer tab 136A and a second spacer tab 136B. The first spacer tab 136A is sized to frictionally fit between a first separation space 140A formed between side surfaces 114 of a first blade 102A adjacent to a second blade 102B of the multi-bladed knife 106. The second spacer tab 136B sized to frictionally fit between a second space 140B formed between side surfaces 114 of the second blade 102B adjacent to a third blade 102C of the multi-bladed knife 106.

The spacer tabs 136 help keep the blades 102 of the knife 106 aligned and separated. Additionally, the spacer tabs 136 help to frictionally fit the protective cover 104 to the blades 102 such that the protective cover 104 will not inadvertently slip along the non-cutting edges 112 of the blades 102 during a cutting operation.

Figure 5:
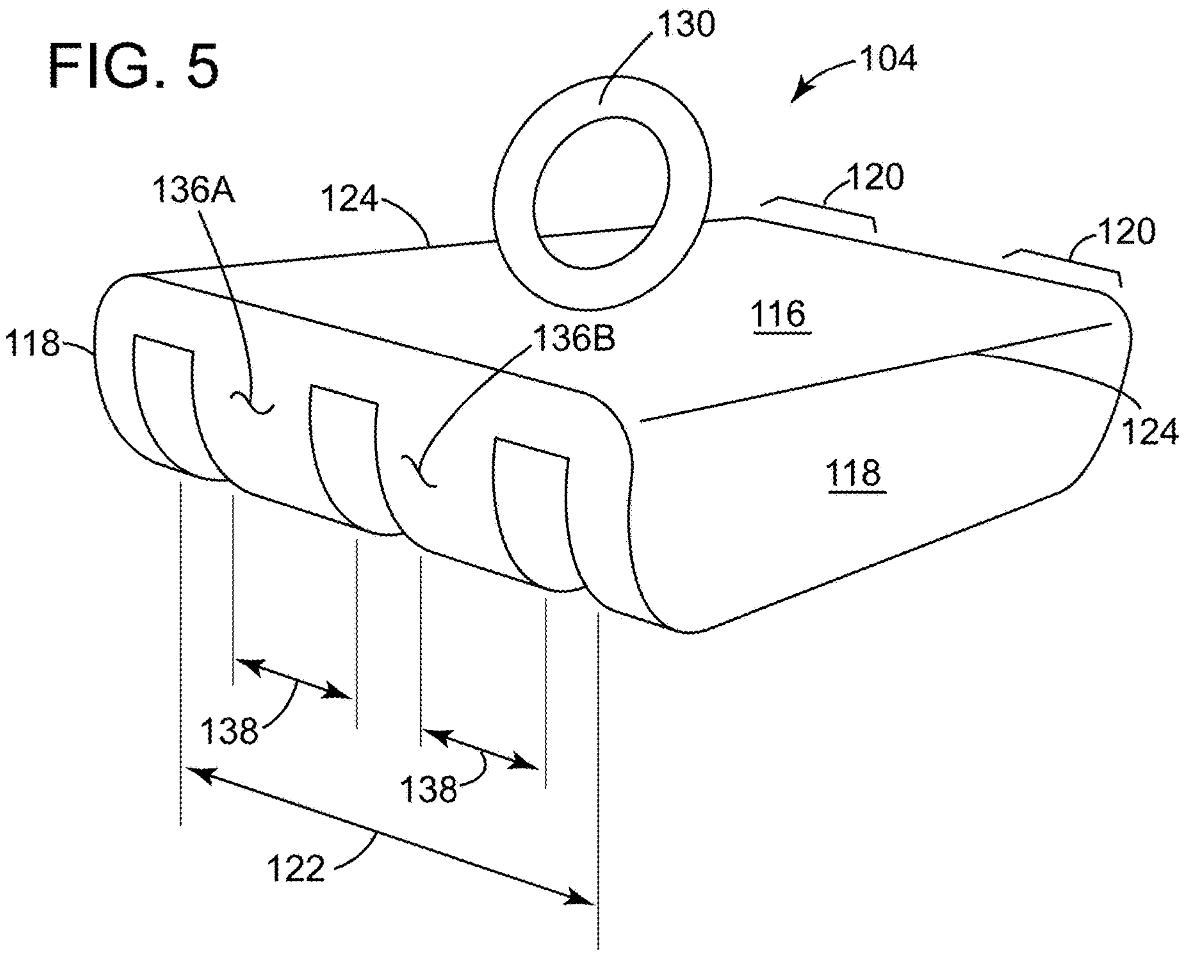
FIG. 5 depicts an example of a perspective view of a protective cover for a 3 bladed multi-blade knife, according to aspects described herein.

Referring to FIG. 5, an example is depicted of a perspective view of a protective cover 104 for a 3 bladed multi-blade knife assembly 100, according to aspects described herein. As described earlier herein, the protective cover 104 is removable from the blades 102 of the knife 106. The protective cover 104 includes the cover top 116. Extending downward from end portions 120 of the cover top 116 are an opposing pair of side walls 118. Extending between the side walls are the first spacer tab 136A and second spacer tab 136B. There can be any number of spacer tabs 136 to frictionally fit between any number of separations spaces 140 formed by any number of pairs of adjacent blades 102 of the multi-bladed knife assembly 100.

Figure 6:
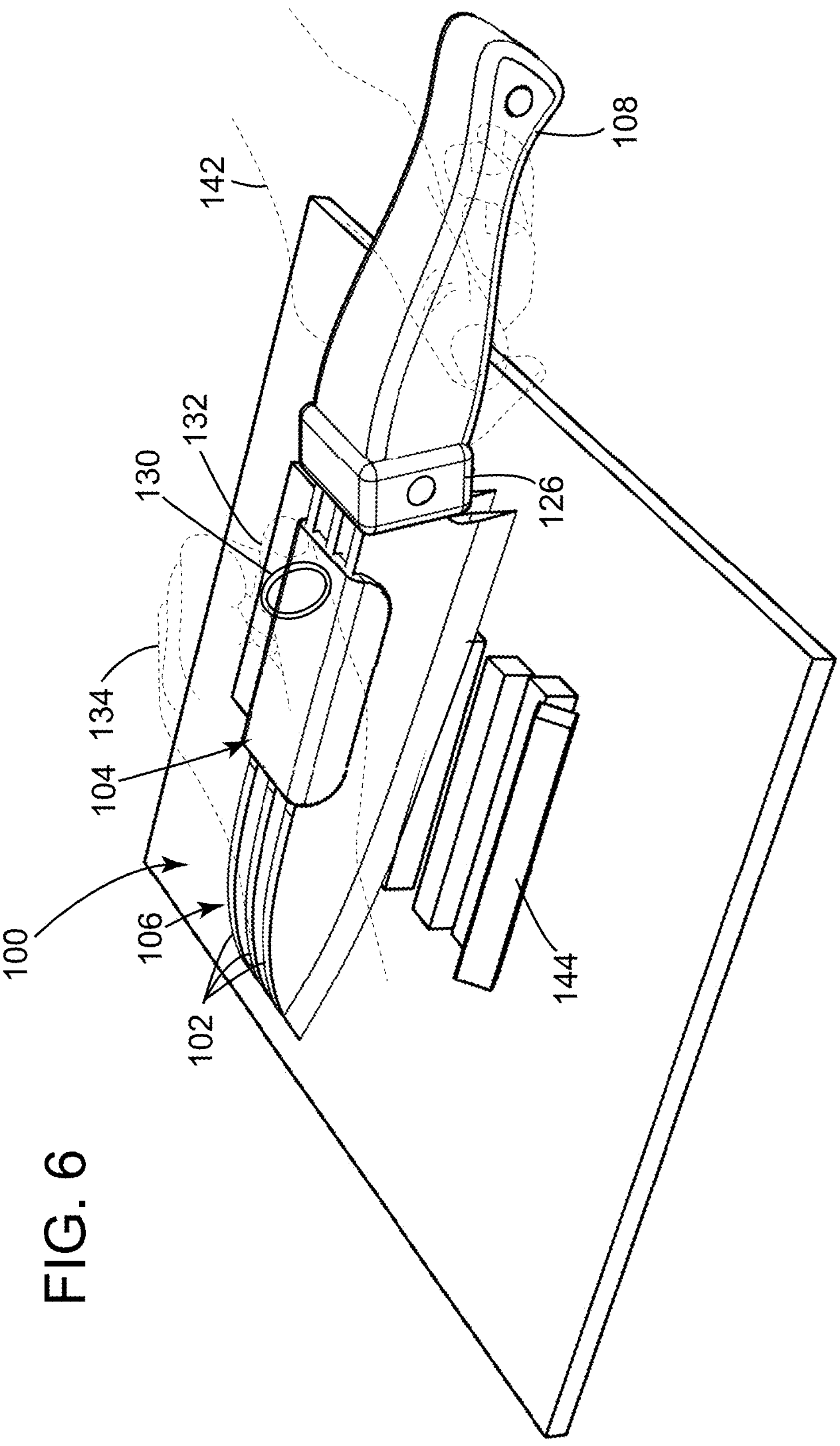
FIG. 6 depicts an example of a view of a 3 bladed multi-blade knife assembly being handled by a user during a chopping operation, according to aspects described herein.

Referring to FIG. 6, an example is depicted of a view of a 3 bladed multi-blade knife assembly 100 being handled by a user during a chopping operation, according to aspects described herein. The user will grasp the handle 108 with one hand 142 and anchor his other hand 134 to the protective cover 104 by slipping a finger 132 through the finger ring 130 attached to the protective cover 104.

The multiple blades 102 may make multiple cuts simultaneously into an object for speed and efficiency. In the example illustrated in FIG. 6, the 3 blades 102 of the knife assembly 100 are simultaneously making three cuts into a carrot 144. However, any number of other items may be used with the knife assembly 100. For example, and without limitation, other vegetables, fruits, nuts or various other food items.

Advantageously, the protective cover 104 over the non-cutting edges 112 of the knife blades 102 provides protection and cushioning of the user's hand 134 during the cutting or chopping operation. Moreover, the finger ring 130 disposed on the protective cover 104 functions to anchor the user's finger 132 to the cover 104 such that the user's hand 134 does not inadvertently slide off of the plurality of blades 102 during the chopping operation.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A knife assembly comprising:

a multi-bladed knife comprising:

a handle, and a plurality of blades attached to the handle, each blade of the plurality of blades extending longitudinally from the handle and substantially parallel to each other, each blade comprising a bottom cutting edge and a top non-cutting edge connected therebetween by opposing blade side surfaces;

a protective cover comprising a cover top and a pair of opposing cover side walls, the cover top configured to fit over a substantial portion of each of the top non-cutting edges of the plurality of blades, the cover side walls extending downward and substantially parallel to each other from opposing end portions of the cover top, the cover side walls spaced a predetermined distance apart to frictionally fit against outer most side surfaces of opposing outer most blades of the plurality of blades; and the protective cover further comprising at least one spacer tab extending downward and substantially parallel to the cover side walls from the cover top, the at least one spacer tab having a thickness that is sized to frictionally fit into at least one separation space formed between side surfaces of a pair of adjacent blades of the knife;

wherein a distal end of the at least one spacer tab, and the pair of opposing cover side walls, leave the bottom cutting edge of each of the plurality of blades exposed for cutting while the protective cover is removably fit in locations along the top non-cutting edge of each of the plurality of blades.

2. The knife assembly of claim 1, wherein the protective cover includes a finger ring pivotally attached to the cover top, the finger ring sized to receive solely a single finger of a user's hand therethrough.

3. The knife assembly of claim 2, wherein:

the protective cover is operable to protect and cushion a user's hand when pressing on the non-cutting edges of the plurality of blades during a chopping operation; and the finger ring is operable to anchor the user's finger to the cover such that the user's hand does not inadvertently slide off of the plurality of blades during the chopping operation.

4. The knife assembly of claim 1, wherein:

the protective cover is configured to be frictionally fit over the plurality of blades; and the protective cover is configured to be removable solely by hand by lifting the protective cover upwards off of the top non-cutting edges of the plurality of blades.

5. The knife assembly of claim 1, wherein the at least one spacer tab comprises a plurality of spacer tabs, each spacer tab sized to frictionally fit into each separation space formed between side surfaces of each pair of adjacent blades of the knife.

6. The knife assembly of claim 1, wherein the at least one spacer tab comprises a single spacer tab sized to frictionally fit between a single pair of blades of the knife.

7. The knife assembly of claim 1, wherein the at least one spacer tab comprises a first and a second spacer tab, the first spacer tab sized to frictionally fit between a first separation space formed between side surfaces of a first blade adjacent to a second blade of the knife, and the second spacer tab sized to frictionally fit between a second space formed between side surfaces of the second blade adjacent to a third blade of the knife.

8. The knife assembly of claim 1, wherein the plurality of blades comprises at least a pair of blades.

9. The knife assembly of claim 1, wherein the plurality of blades comprises at least three blades.

10. The knife assembly of claim 1, wherein each blade of the plurality of blades are removably attached to the handle of the knife.

11. The knife assembly of claim 1, comprising a blade connector mechanism positioned between the handle and the plurality of blades, the blade connector mechanism operable to attach and detach each blade of the plurality of blades to the handle of the knife.

12. A protective cover for a multi bladed knife, the knife including a handle, and a plurality of blades attached to the handle, each blade of the plurality of blades extending longitudinally from the handle and substantially parallel to each other, each blade comprising a bottom cutting edge and a top non-cutting edge connected therebetween by opposing blade side surfaces, the protective cover comprising:

a cover top configured to fit over a substantial portion of each of the top non-cutting edges of the plurality of blades;

a pair of opposing cover side walls, the cover side walls extending downward and substantially parallel to each other from opposing end portions of the cover top, the cover side walls spaced a predetermined distance apart to frictionally fit against outer most side surfaces of opposing outer most blades of the plurality of blades of the knife; and the protective cover further comprising at least one spacer tab extending downward and substantially parallel to the cover side walls from the cover top, the at least one spacer tab having a thickness that is sized to frictionally fit into at least one separation space formed between side surfaces of a pair of adjacent blades of the knife;

wherein a distal end of the at least one spacer tab, and the pair of opposing cover side walls, leave the bottom cutting edge of each of the plurality of blades exposed for cutting while the protective cover is removably fit in locations along over the top non-cutting edge of each of the plurality of blades.

13. The protective cover of claim 12, comprising a finger ring pivotally attached to the cover top, the finger ring sized to receive solely a single finger of a user therethrough.

14. The protective cover of claim 13, wherein:

the protective cover is operable to protect and cushion a user's hand when pressing on the non-cutting edges of the plurality of blades during a chopping operation; and the finger ring is operable to anchor the user's finger to the cover such that the user's hand does not inadvertently slide off of the plurality of blades during the chopping operation.

15. The protective cover of claim 12, wherein:

the protective cover is configured to be frictionally fit over the plurality of blades; and the protective cover is configured to be removable solely by hand by lifting the protective cover upwards off of the top non-cutting edges of the plurality of blades.

16. The protective cover of claim 12, wherein the at least one spacer tab comprises a plurality of spacer tabs, each spacer tab sized to frictionally fit into each separation space formed between side surfaces of each pair of adjacent blades of the knife.

17. The protective cover of claim 12, wherein the at least one spacer tab comprises a single spacer tab sized to frictionally fit between a single pair of blades of the knife.

18. The protective cover of claim 12, wherein the at least one spacer tab comprises a first and a second spacer tab, the first spacer tab sized to frictionally fit between a first separation space formed between side surfaces of a first blade adjacent to a second blade of the knife, and the second spacer tab sized to frictionally fit between a second space formed between side surfaces of the second blade adjacent to a third blade of the knife.

* * * * *